United States Patent [19]

Gantzhorn, Jr. et al.

[11] Patent Number: 4,698,701
[45] Date of Patent: Oct. 6, 1987

[54] HIGH SPEED THERMOMAGNETIC TAPE DUPLICATION

[75] Inventors: John E. Gantzhorn, Jr., Hockessin, Del.; John W. McCloud, II, Elkton, Md.; Robert O. Uhler, Malvern, Pa.

[73] Assignee: E. I. Du Pont de Nemours and Company, Wilmington, Del.

[21] Appl. No.: 848,091

[22] Filed: Apr. 4, 1986

[51] Int. Cl.$^4$ .............................................. G11B 5/86
[52] U.S. Cl. ...................................................... 360/16
[58] Field of Search ............................ 360/15, 16, 17; 346/74.3, 74.4

[56] References Cited

U.S. PATENT DOCUMENTS

| | | | |
|---|---|---|---|
| 3,108,728 | 10/1963 | Selsted | 226/95 |
| 3,613,102 | 10/1971 | Daly et al. | 346/74 MT |
| 3,632,898 | 1/1972 | Slade et al. | 179/100.2 E |
| 3,761,645 | 9/1973 | Stancel, Jr. et al. | 179/100.2 E |
| 3,824,617 | 7/1974 | Kobayashi et al. | 360/16 |
| 3,825,948 | 7/1974 | Hendershot, III et al. | 360/16 |
| 3,928,747 | 12/1975 | Hanai et al. | 219/216 |
| 4,213,159 | 7/1980 | King | 360/16 |

OTHER PUBLICATIONS

Odagiri and Sato, High Speed Video Tape Duplication Using Contact Printing, *IEEE Transactions on Consumer Electronics*, vol. CE-30, No. 3, Aug. 1984.

Kihara, Odagiri and Sato, High Speed Video Tape Duplication Using Contact Printing, *IEEE International Conference on Consumer Electronics Digest of Technical Papers*, Ch 1872-1, Jun. 1983.

Cole, Bancroft, Chouinard and McCloud, Thermomagnetic Duplication of Chromium Dioxide Video Tape, *IEEE Transactions on Magnetics*, vol. MAG-20, No. 1, Jan. 1984.

Wierenga, Winsum and Linden, *Roughness and Recording Properties of Particulate Tapes: A Quantative Study.*

Hagopian, Thermomagnetic Transfer Mass Storage, *IBM Technical Disclosure Bulletin*, vol. 16, No. 12, May 1974.

*Primary Examiner*—Vincent P. Canney

[57] ABSTRACT

A process and equipment is disclosed that is capable of duplicating magnetic tapes at speeds higher than 2.5 meters/second. Tape surfaces are selected that have sufficient roughness to readily permit air to bleed from between surfaces as they are held together by air pressure during the duplication process.

26 Claims, 8 Drawing Figures

HIGH SPEED THERMOMAGNETIC TAPE DUPLICATION

This invention relates to a method and apparatus for high speed thermal magnetic duplication of a recording from a master magnetic tape to a receiving magnetic tape and more particularly to a method and apparatus for reducing defects due to insufficient contact between the master and receiving tapes during the duplication process.

BACKGROUND OF THE INVENTION

Wide spread use of home video recording and playback equipment has increased the demand for prerecorded cassettes, especially half-inch video cassettes. Fast production of such cassettes is difficult, because video signals contain a large amount of information which must be reproduced with a high degree of accuracy to maintain adequate image and color standards.

At present, the preferred video recording method used by this industry is to use upward of 1,000 recording machines, all operating simultaneously, all receiving a realtime signal from one master playback machine to produce multiple copies. The logistics of providing, loading, unloading, operating and maintaining such multitude of relatively complex equipment makes reproduction a very expensive process.

Another approach to magnetic recording duplication is non-realtime duplication known as magnetic replication. In this type of duplication, the signal pattern from a master tape is replicated directly on the receiving tape at very high speed. The magnetic pattern in this process is printed onto a receiving tape in much the same way as a visible image is printed through a high speed press onto a sheet of paper. Copy speeds in excess of 100 times realtime duplication have been reported.

Tape replication is obtained through either of two well known processes. One comprises bringing the surface of a master tape having a very high degree of coercivity into intimate contact with the surface of a conventional low coercivity magnetic tape in the presence of a magnetic field and removing the external field while maintaining contact. This is known as anhysteretic tape replication and is described in an article by Y. Odagiri and T. Sato entitled "High Speed Video Tape Duplication" which appeared in the August 1984 IEEE transactions on Consumer Electronics.

The second method also involves bringing the two tape surfaces into intimate contact, and then momentarily raising the temperature of the copy tape to above the magnetic material's Curie temperature; while the two surfaces are still in contact, the tape is cooled below its Curie temperature and then the tapes are separated. This method, is known as thermal magnetic replication: It is, of course, essential that the copy tape have a low Curie temperature when thermal magnetic replication is used to prevent heat damage to the polyester supporting base of the tape. The master tape on the other hand should have a high Curie temperature.

Thermal magnetic duplication is also well known in the art and described in various publications, such as U.S. Pat. No. 4,213,159 issued to King, as well as this assignee's copending application U.S. Ser. No. 774,885 which describes a thermal replication system and associated apparatus in which a laser beam is used to momentarily heat a copy tape having a Curie temperature of below 130° C. in contact with a master tape having a Curie temperature above 500° C. while both tapes are under pressure in a nip formed between a glass roller and an elastomeric pressure roller.

Experience with both real and non realtime tape duplication indicates that close contact is required between tape to tape or tape to magnetic head surfaces in order to assure maximum signal transfer, especially in the reproduction of short wavelengths. Thus, the trend in the art is toward the development of smooth surface tapes.

In order for non realtime duplicating system to be commercially successful and to compete with the realtime equipment, it is desirable to copy the magnetic pattern from the master tape onto the copy tape at very high speed, since in this process only one tape is produced at a time. To increase replication speed, it has been proposed to use a looped master tape together with a large supply of blank copy tape for uninterrupted running. After replication, the copy tape is cut to the appropriate length for each copy.

As the replication speeds are increased, it becomes progressively more difficult to maintain contact and registration of the master and copy tape with the required degree of accuracy to produce an acceptable signal transfer which will generate a high quality video signal for eventual use in home video cassette recorder and viewing equipment. In the aforementioned article by Odagiri et al., this problem has been recognized and a number of solutions have been proposed, such as the use of air pressure to maintain contact between the tapes, air bearings to provide smooth tape running, an auxiliary "driving tape" to drive the tapes through the printing station, and smooth surface tapes to assure intimate contact between the two tapes by reducing the spacing between the master and copy tape surfaces.

The problems recognized by Odagiri and present in the anhysteretic magnetic replication method are also present in the thermal magnetic replication system, since they are inherent to high speed reproduction. Briefly stated, the challenge consists of bringing two tape surfaces momentarily into intimate contact as they are driven at very high speed through a printing station, without any relative slippage. If the tapes are not in contact because of air entrapment between the surface, they either completely float apart or develop pockets of entrapped air, and the amplitude, phase or registration of the transferred signal will be diminished or altered. If the tapes, because of floating or other drive irregularities, also slip relative to each other, the replication will no longer be true, and the result will again be a loss of signal amplitude on playback. This may exhibit a periodicity, in which case it is referred to as "breathing" or may appear as a random effect.

In an effort to alleviate these problems, a high pressure nip roller printing station has been used. However, registration and contact problems resulting in uneven playback signal reappeared in the prior art equipment employing nip rollers for thermomagnetic duplication at speeds of about 60 to 90 inches per second. At high speed, "breathing", again degrades the signal limiting the speed of duplication. It appears that "breathing" is the result of mechanical tape drive problems, such as edge alignment of the copy and master tape, or floating, which become more evident as higher tape duplication speeds are attempted. Higher and higher pressure in the nip tends to alleviate "breathing". However, as the relative pressure increase, the mechanical problems of registration, drive and concentricity of the rollers become accentuated, introducing other sources of signal degradation. There is thus still need for a method to produce high quality duplicate tapes at speeds in excess of 100 inches per second (2.5 meters/second) by alleviating the signal degradation.

SUMMARY OF THE INVENTION

The present invention provides a process for high speed duplication of tapes, capable of duplicating tapes at speeds in excess of approximately 2.5 meters/sec. consisting essentially of:

(a) contacting the surface of a first magnetic layer comprising magnetic particles in a binder coated on a first supporting web with the surface of a second magnetic layer which also comprises magnetic particles in a binder coated on a second supporting web, the first and second surfaces of the magnetic layers having a combined measure of roughness in excess or 0.0250 micrometers, the second magnetic layer bearing a magnetic pattern, under pressure exerted thereon through a fluid medium, said pressure having a generally wedge shaped profile with a peak extending substantially across the full width of the magnetic layers;

(b) exposing the first magnetic layer to a high intensity beam of radiant energy for a time sufficient to raise the temperature of the magnetic particles in said layer to a temperature above its Curie temperature;

(c) cooling said first layer, while in contact with the second layer, to a temperature below the Curie temperature of the magnetic particles in said first layer; and (d) separating the two layers.

Surprisingly, the use of a rough surface especially on the second layer (i.e., the master tape) does not adversely effect the quality of the replicated signal. The magnetic layer on the first layer (i.e., the copy tape) is preferably comprised of acicular $CrO_2$ particles in a binder composition. The pattern bearing tape is preferably a high coercivity iron tape bearing a mirror image of the magnetic pattern that will be reproduced in the copy tape. It is also preferred that the second magnetic layer surface has a measure of roughness exceeding 0.008 micrometers.

An apparatus useful in this duplication comprises means to drive first and second magnetic layers comprising magnetic particles in a binder coated on first and second supportive webs through a print station comprised of print wheel means in opposition with fluidic pressure applying means; means that apply high intensity focussed radiant energy to the first layer, while the first layer is in contact with the second layer, sufficient to allow the temperature of the magnetic particles in the first layer to rise above their Curie point; means to separate the first and second layers following passage through the print station after said first layer has cooled below its Curie temperature, the first and second layers having surfaces having a combined surface measure of roughness exceeding 0.0250 micrometers.

BRIEF DESCRIPTION OF THE DRAWINGS

This invention will now be described with reference to the attached figures in which similar numbers indicate similar parts and in which.

DETAILED DESCRIPTION OF THE INVENTION

Figure 1:
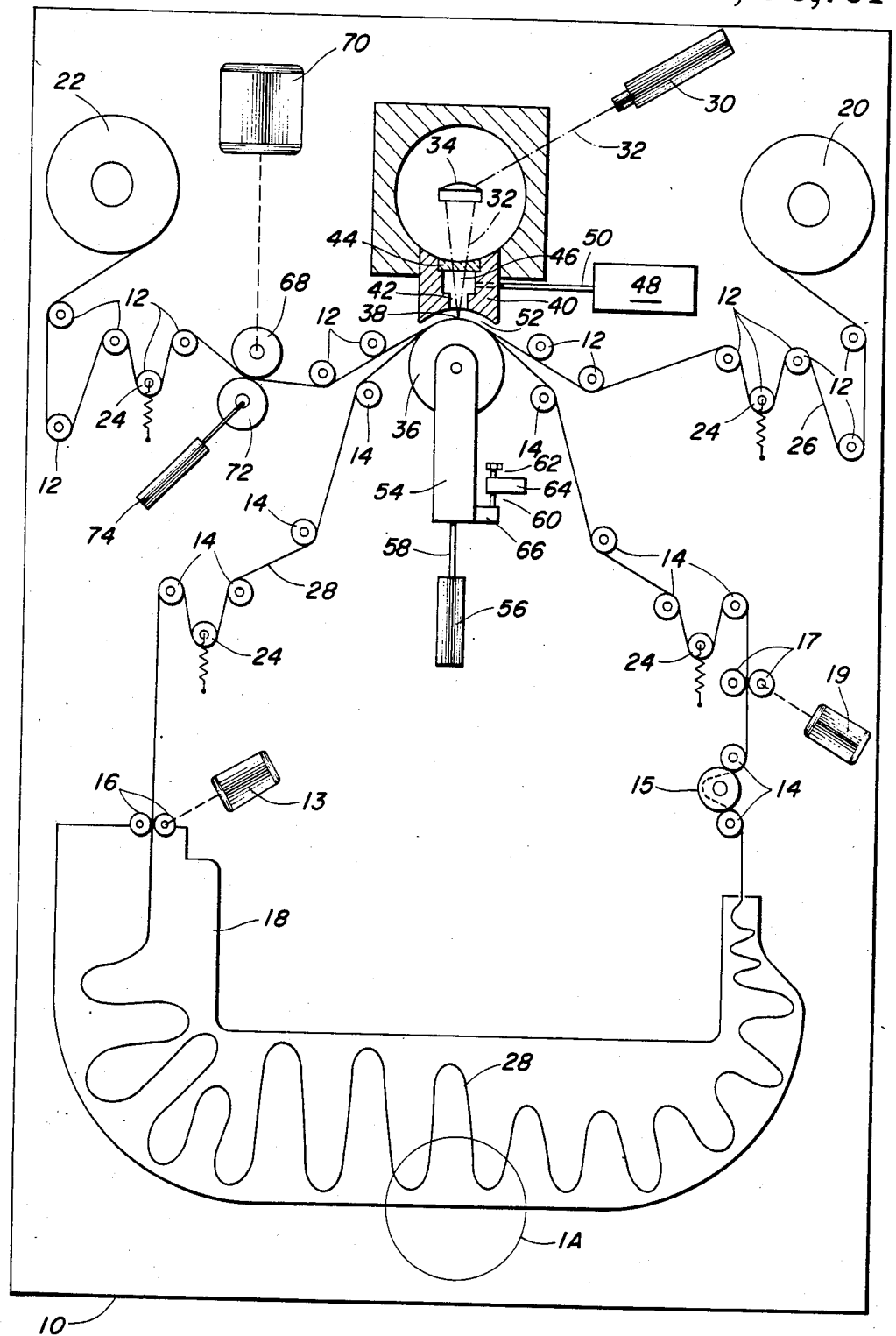
FIG. 1 is a schematic representation of a tape duplicating apparatus in accordance with the present invention.

Referring now to FIG. 1, there is depicted in schematic representation, and not to scale, an apparatus useful in practicing the invention. The apparatus has a supporting frame 10 on which there are mounted two tape transport systems. The first tape transport system is used to transport copy tape 26 on which a signal pattern will be replicated. Copy tape 26 is supplied in bulk form from a supply "pancake" (reel) 20. A guiding system comprising a plurality of guide rollers 12 is used together with a number of tape tension control rollers 24 to drive copy tape 26 through a printing station described in detail below. A take up reel 22 collects the copy tape following passage through the printing station.

The copy tape 26 is driven through a capstan 68 and pinch roller 72 arrangement. A highly regulated speed motor drive 70 is used to drive the capstan 68. Pinch roller 72 is mounted on a moveable support. A pneumatic cylinder 74 allows the roller to be brought against the capstan as well as to be removed from contact therefrom. The pneumatic cylinder permits to regulate the pressure applied at the nip between roller 72 and capstan 68.

A second tape transport drive, comprising a combination of master tape guide rollers 14 and tension control rollers 24 is used to drive a master tape 28 past the printing station. In the preferred embodiment, the two ends of the master tape are joined to form a continuous loop, which is stored in loop bin 18. A set of driven entry rollers 16 guides the tape into the bin.

Figure 1A:
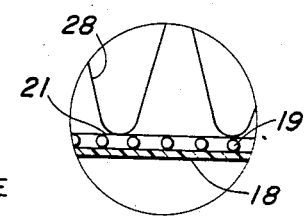
FIG. 1A is an enlarged view of a portion of the floor of the loop bin employed in the apparatus of FIG. 1.

In order to facilitate the tape movement through the bin, it is preferred that all portions of the lower bin wall having a horizontal component be provided with a combination roller O-ring arrangement of the type shown in blow-up FIG. 1A. In such arrangement, small rollers 19 driven at a controlled speed by a common drive not shown in the drawing are used in pairs, coupled with an O-ring 21 to provide what is commonly referred to as a "live floor", to prevent the tape from dragging and possibly accumulating a static charge which can damage it. A tension generating wheel 15 is used at the exit of the loop bin to supply the needed drag on the tape, for the operation of the constant tension arrangement 24 and the tape drive 17. Motors 13 and 19 are used to power drives 16 and 17.

The printing station comprises an energy applying means and a pressure applying means. The energy applying means preferably but not exclusively, comprise an Neodemium Yag Infra-red laser 30 which provides an output beam 32 at a 1.06 micrometer wavelength. An optical focussing system 34 is used to generate a focussed line beam of energy extending across at least the full width of the copy tape along line 38. The beam is preferably precisely focussed at a line in space where the magnetic oxide layer 100 of the copy tape 26 as described hereinafter is located in its passage through the printing station. Thus, the energy of the laser beam is used to heat the magnetic layer rather than the supporting base 102, or the master tape 28. It is recognized, of course, that in practice the laser beam is never focussed in exactly one plane because of the depth of focus phenomenon, in which the area of convergence of the beam has a finite dimension in the direction of the beam propagation.

In order to obtain such accurate tape positioning as well as for other reasons to be discussed below, there is employed a pressure applying means comprising a print wheel 36 in combination with an air cap 40.

The print wheel 36 is a circular, highly polished, highly concentric rotating back up roller mounted on a moveable support 54. Support 54 is constructed to locate the print wheel 36 at a fixed position relative to the focussed laser beam 38 and create an accurately sized gap 52 between a pressure applying means 40 and the print wheel 36. To that extent, the moveable support 54 may comprise a bracket 66 adapted to rest against an adjustable abutment 60 affixed on frame 10 equipped with a micrometer position control 62. A pneumatic cylinder 56 drives the print wheel and its support in an out of the operating position.

Figure 2:
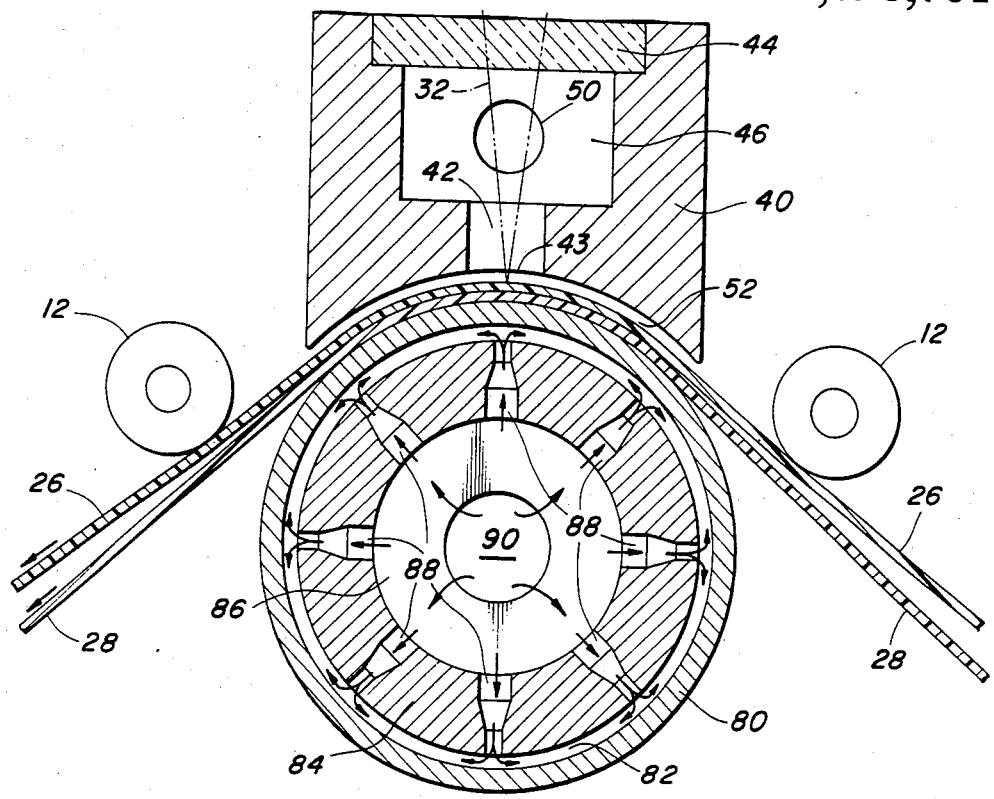
FIG. 2 is an enlarged view of the print station of the apparatus shown in FIG. 1.
Figure 5:
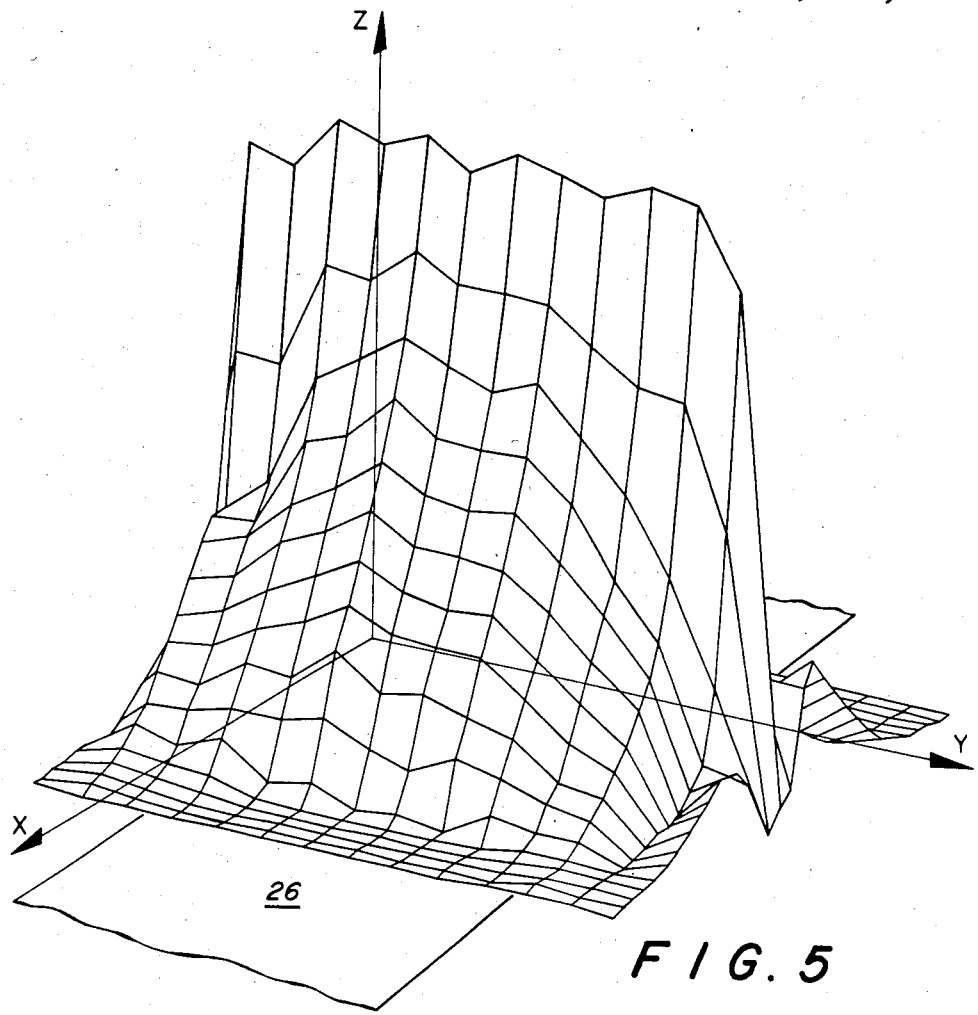
FIG. 5 is a diagramatic representation of the pressure profile across the printing station during the duplicating process.

Mounted above the print wheel 36 is a pressure applying means comprising an aircap 40. As seen in greater detail in FIG. 2, the aircap 40 includes a pressure equalizing cavity 46 connected to a pressurized air supply 48 (shown in FIG. 1) through a conduit 50. Air cavity 46 is sealed at its upper end through an optically transparent window plate 44 which allows passage of the laser beam 32 with preferably minimal energy loss. The bottom end of cavity 46 communicates with the atmosphere through an air gap 42 terminating in a slot 43. The laser beam 32 is also directed through the same air gap. When the print wheel 36 is in its operating position and both the master and copy tapes threaded through the print station, a second exhaust gap 52 is formed between the air cap 40 and the backside of the copy tape 26. The combined dimensions of the gaps 42 and 52 are selected such that the pressure profile on the tapes through the print station when air is blown into the pressure equalizing cavity will assume a generally wedge shaped profile of the type shown in FIG. 5. The peak of the wedge is on a plane perpendicular to the print wheel 36, substantially coincident with focussed laser beam 38. The magnitude of the applied pressure on the tapes should be at least 40 psig and preferably higher than 50 psig. When duplicating one half inch tapes, the air flow rate through the gap 42 is limited to below 20 standard cubic feet per minute (scfm). Generally, it has been observed that increasing the pressure to above approximately 90 psig, or the flow rate in excess of 20 scfm, results in tape flutter along tap entry and exit points of the gap 52. Similarly, it is desirable that the integrated pressure over the contacting tape surfaces in the printing station (the integral of the curve shown in FIG. 5 over the tape surface under it) must exceed 12.5 pounds to assure that both tapes are driven through the station without relative slippage.

In the preferred embodiment, the print wheel 36 comprises an outer supporting ring 80 which is highly accurately circular over an inner supporting ring 84 sized to define an air space 82 between it and outer ring 80. A number of air nozzles 88 in the ring 84 communicate between the air space 82 and a pressure equalizing chamber 86. Air inlet 90 allows air under pressure to be blown into cavity 86 and through nozzles 88 into air space 82 to float ring 80 to allow smooth rotation as the tapes 28 and 26 are driven through the printing station. It has been found that such air ring air cap combination as described above provides a substantially smoother drive at very high speed than can be obtained when pinch rollers are used, and air bearings have been proven smoother than traditional roller bearings.

As briefly discussed in the prior art section, as the speed of replication is increased past 90 to 100 inch per second (2.28 to 2.54 m/sec). the problem described as breathing, reappears. In more details, it is believed that the following causes may be the source of this problem, which is shown in FIG. 3.

Figure 3:
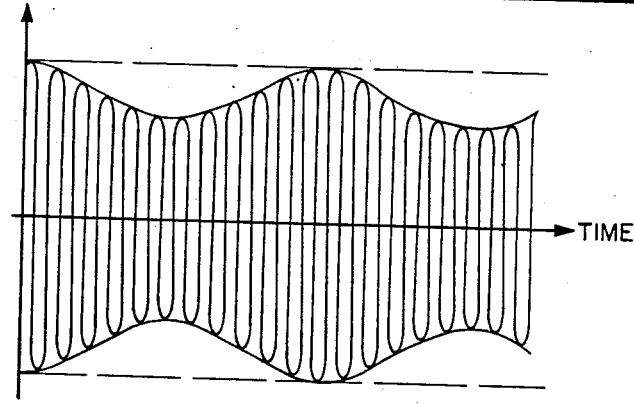
FIG. 3 is a schematic representation of an oscilloscope trace of a video signal duplicated on a copy tape.
Figure 6:
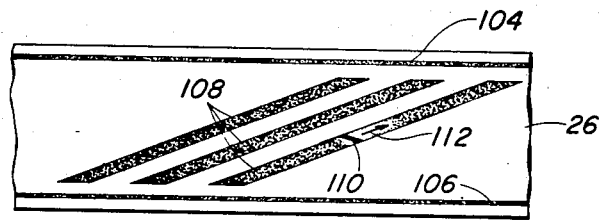
FIG. 6 is a schematic representation of the magnetic signal pattern to be replicated.
Figure 7:
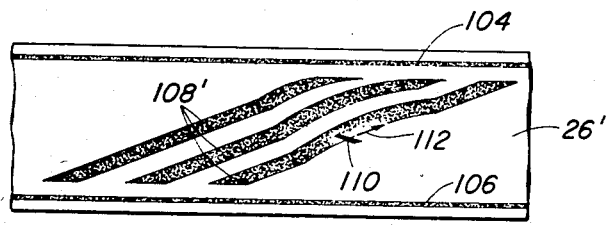
FIG. 7 is a schematic representation of a replicated signal exhibiting a breathing defect.

FIG. 3 represents an oscilloscope trace of the amplitude of a copy tape RF signal on playback. When a constant amplitude signal is recorded on the master tape 28, if properly replicated on copy tape 26, upon playback it will produce a constant amplitude RF output signal, the envelope of which should follow the dotted line shown in that Figure. If, however, during the replicating process the two tapes are slipping relative to each other, the tracks 108 on the copy tape will no longer be straight as shown in FIG. 6, but will have some slippage distortion as shown in FIG. 7 by tracks 108'. The linear, non-high fidelity audio track 104 and synchronization track 106 which runs in the tape direction will not be significantly affected, but will be simply slightly elongated with no substantial ill effects. However, because the video and any high fidelity audio tracks are slanted, and because the playback head represented by the mark 110 has a predetermined width commensurate with the track width and moves along a fixed predetermined path represented by arrow 112 precalculated to follow a straight track, the playback head will only cover a portion of the distorted track 108'. As result the amplitude of the output will be reduced in proportion to the distortion in the track. As the two tapes move back into alignment and the replicated track resumes a straight line shape, the output amplitude returns to its proper level. The oscilloscope trace periodically decreases moves along the time axis and returns to the level of the dotted line, creating the appearance of an RF signal "breathing" pattern, thus giving this name to this type of defect. Of course, depending on the causes of misalignment, there may or may not be a periodicity in the amplitude variation, and one may well observe a random appearance to amplitude defects.

Amplitude variations may also be the result of improper localized loss of contact between the magnetic master tape 28 and the copy tape 26 occurring at the point of print transfer. If for instance a pocket of air is trapped between the two tapes as they enter the high pressure zone, the tapes will be locally separated and the magnetic field of the master tape will be weaker since the copy tape is further away. Thus, the transferred pattern signal amplitude will be lower resulting again in output signal variation.

Figure 4:
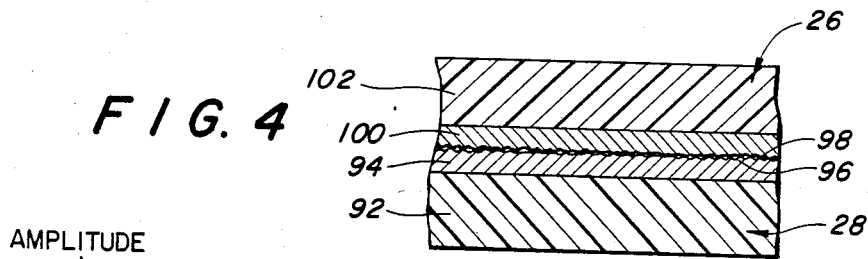
FIG. 4 is a schematic representation of a cross-section of the master and copy tapes in contact with each other.

Using the apparatus described above, the present invention has achieved a reduction in the breathing problem. It has obtained this improvement by providing a tape drive and an applied pressure profile as disclosed above, resulting in better control of the contact between the master and the copy tapes as they are transported through the printing station. Furthermore, it has been discovered that contrary to the teachings of Odagiri et al. above, the use of smooth surface tapes in the apparatus for tape duplication described herein is not an advantage. Contrary to the commonly held belief that the copy tape must be brought in as intimate contact as possible with the master tape during the transfer, it has now been discovered that it is desirable, especially as the tape copying speed exceeds 90 to 100 inches per second (2.28 to 2.54 meters/second) to provide a roughened surface between the copy and master tape as shown in FIG. 4 in order to allow small channels through which air entrapped between the two tapes may readily escape through the sides. As a result, better effective contact is obtained consistently between the master and copy tapes. This better contact and air escape additionally tends to minimize floating in which an air layer completely separates the two surfaces as well as air pockets. It further provides better traction between the tapes greatly reducing any tendency for relative slippage either in the direction of the tape drive or transversely to it.

The tape whose surface roughness may best be controlled without requiring to modify the nature of the final commercial product, i.e. the copy tape, is the master tape. Typically, the master tape comprises a polyester film base 92 overcoated with a high coercivity, high Curie temperature coating of metal particles in a binder layer. An antistatic back layer may also be provided, typically 0.7 micrometers thick.

In a preferred embodiment, a metal tape produced by T.D.K. Co., of Japan, having typical roughness measurements, obtained using an instrument manufactured by Taylor Hobson Ltd. under the name Talystep were 0.0051 micrometers for a "smooth" surface tape. 0.0081 micrometers for a "medium" and 0.0105 for a "rough" tape surface. The measurements are the arithmetic average of five (5) traces each 0.05 cm long in the long (machine) direction of the tape using a force of 2 milligrams on the stylus. The stylus has a tip diameter of 2.54 micrometers (100 microinches). For the above measurements, the tape is placed on an optically flat surface.

Copy tape surface roughness measured in the same manner was 0.0160 to 0.0170 micrometers. Copy tapes comprise a polyester base support 102 on which there is deposited a layer 100 comprising acicular magnetic chromium dioxide particles in a binder composition. Such tapes are commercially available from a number of manufactures including PD-Magnetics, Sony Corp., BASF and others. Chromium dioxide is ideally suited for thermal magnetic duplication since it has a Curie point below about 130° C. Metal and metal oxide tapes, on the other hand, have a Curie temperature of about 500° C. and above. When a smooth master tape was employed with a typical chromium dioxide tape providing a combined roughness of the order of 0.021 to 0.022 micrometers, at speeds of 4.0 meters per second, unacceptable amplitude variations reaching 50 percent were observed on an oscilloscope screen. Using a medium roughness tape, i.e. combined roughness of the order of 0.024 to 0.025 micrometers the results were improved with amplitude variations observed varying between 20 percent and 40 percent. Finally, when a rough surface master tape was used with the same type of copy tapes, i.e. combined roughness of 0.0265 to 0.0275 micrometers, amplitude variations were confined to below about 20 percent. Since RF breathing amplitudes of the order of about 30 percent or less are not visible on playback, a replication process using master tapes of medium to rough surfaces as defined produces acceptable commercial copy tapes when used in an apparatus as generally described. Smooth master tapes, contrary to what may be expected, do not.

In describing the apparatus of the present invention, a number of elements have not been specifically described, since they are well known in the art, and alternate embodiments may be readily obtained. Such are, for instance, the tension control devices constant speed drive, rollers etc. whose criticality is one of function rather than design. Similarly, while specific embodiments have been given, other elements having similar function may be readily substituted. For instance, while heating of the copy tape is preferentially accomplished using an infrared output laser capable of raising the chromium dioxide temperature locally in the extremely brief period while the tape traverses the focussed laser beam, any other means can be used that are capable of similarly heating the magnetic layer without heating the base to a point where it would show shrinkage in excess of 0.03 percent. Also, while air under pressure is used in the pressure applying means and the air bearing, other fluid may be used without departing from the scope of the present invention. While the invention has been described with respect to ½ inch video tape duplication, it is also applicable to duplication of other helical scan information patterns such as high fidelity audio tapes and the like. The practitioner of the art will device these and other modifications which are within the scope of this invention as claimed.

We claim:

1. A process for the thermal replication of magnetic tape, capable of replicating tapes at speeds in excess of approximately 2.5 meters/sec. consisting essentially of:
   (a) contacting the surface of a first magnetic layer comprising magnetic particles in a binder coated on a first supporting web with the surface of a second magnetic layer which also comprises magnetic particles in a binder coated on a second supporting web, the first and second surfaces of the magnetic layers having a combined measurement of roughness in excess of approximately 0.025 micrometers, the second magnetic layer bearing a magnetic pattern, under pressure exerted thereon through a fluid medium, said pressure having a generally wedge shaped profile with a peak extending substantially across the full width of the magnetic layers;
   (b) exposing the first magnetic layer to a high intensity beam of radiant energy for a time sufficient to raise the temperature of the magnetic particles in said layer to a temperature above its Curie temperature, while maintaining said fluid pressure;
   (c) cooling said first layer, while in contact with the second layer, to a temperature below the Curie temperature of the magnetic particles in said first layer while maintaining said fluid pressure; and
   (d) separating the two layers.

2. The process of claim 1 wherein the fluid pressure in step (a) is air exerting a pressure of approximately 40 to 90 psig.

3. The process of claim 2 wherein the integral of fluid pressure over the tape surfaces during steps (a) through (c) is at least approximately 12.5 pounds.

4. The process of claim 2 wherein combined roughness of said first and second magnetic layers exceed 0.0265 micrometers.

5. The process of claim 4 wherein thermal replication occurs at speeds of at least approximately 4 meters/second.

6. The process of claim 4 wherein the magnetic particles in said first magnetic layer are chromium dioxide particles having a Curie temperature below approximately 130° C.

7. The process of claim 6 wherein the magnetic particles in said second magnetic layer have a Curie temperature in excess of approximately 500° C.

8. The process of claim 7 wherein said second magnetic surface has a roughness of at least approximately 0.0105 micrometers.

9. A process for the thermal replication of magnetic tape, capable of replicating tapes at speeds in excess of approximately 2.5 meters/sec. consisting essentially of:
   (a) contacting the surface of a first magnetic layer comprising magnetic particles in a binder coated on a first supporting web with the surface of a second magnetic layer which also comprises magnetic particles in a binder coated on a second supporting web, the second magnetic layer surface having a roughness measurement in excess of approximately 0.008 micrometers and bearing a magnetic pattern, under pressure exerted thereon through a fluid medium, said pressure having a generally wedge shaped profile with a peak extending substantially across the full width of the magnetic layers;
   (b) exposing the first magnetic layer to a high intensity beam of radiant energy for a time sufficient to raise the temperature of the magnetic particles in said layer to a temperature above its Curie temperature, while maintaining said fluid pressure;
   (c) cooling said first layer, while in contact with the second layer, to a temperature below the Curie temperature of the magnetic particles in said first layer while maintaining said fluid pressure; and
   (d) separating the two layers.

10. The process of claim 9 wherein the fluid pressure in step (a) is air exerting a pressure of approximately 40 to 90 psig.

11. The process of claim 9 wherein the integral of fluid pressure over the tape surfaces during steps (a) through (c) is at least approximately 12.5 pounds.

12. The process of claim 9 wherein combined roughness of said first and second magnetic layers exceed 0.0265 micrometers.

13. The process of claim 9 wherein thermal replication occurs at speeds of at least approximately 4 meters/second.

14. The process of claim 13 wherein the magnetic particles in said first magnetic layer are chromium dioxide particles having a Curie temperature below approximately 130° C.

15. The process of claim 14 wherein the magnetic particles in said second magnetic layer have a Curie temperature in excess of approximately 500° C.

16. Apparatus for thermal duplication of a master magnetic tape, having a magnetic layer with a surface roughness of at least 0.008 micrometers, to a copy tape having a magnetic layer, said apparatus comprising:
   (a) a print station including print wheel means;
   (b) drive means capable of transporting said master and copy tapes through the print station at speeds in excess of 2.5 meters/second;
   (c) fluid pressure means located adjacent to said print wheel means adapted to provide a wedge shaped fluid profile to said master and copy tapes, holding said tapes in intimate contact as the tapes are transported through the print station;
   (d) heating means comprising a focussed radiant energy source for applying high intensity energy to the magnetic layer of said copy tape while it is in contact with the magnetic layer of said master tape, the applied energy being sufficient to raise the temperature of the magnetic layer of said copy tape to above its Curie temperature; and
   (e) means to separate the copy tape from the master tape after temperature of the copy tape magnetic layer has dropped below its Curie temperature.

17. Apparatus in accordance with claim 16 wherein said fluidic pressure applying means comprise a source of pressurized fluid and an air cap having a body including a cavity therein, the cavity communicating at its lower end with the outside of said body through a gap located adjacent the print wheel such that a plane drawn through the center of the gap extends substantially through an axis through the center of the print wheel.

18. Apparatus in accordance with claim 16 wherein the distance of the gap from the print wheel is adjustable.

19. Apparatus in accordance with claim 18 wherein said source of pressurized fluid supples fluid at a rate not exceeding 20 scfm through said gap.

20. Apparatus in accordance with claim 18 wherein the maximum pressure applied to said master and copy magnetic layers is between 40 psig and less than about 90 psig.

21. Apparatus in accordance with claim 20 wherein said fluid is air.

22. Apparatus in accordance with claim 21 wherein said focussed radiant energy applying means comprise an infrared laser and associated optical system capable of focussing the laser output along a line extending at least the full width of the first magnetic layer.

23. An apparatus for thermal magnetic replication of a signal pattern from a master tape having a reference edge onto a copy tape also having a reference edge, each of the tapes including a magnetic layer, at speeds in excess of 2.5 meters per second comprising:
   (a) a frame;
   (b) guide means on said frame to bring the magnetic layers of the copy and master tape into continuous running contact with each other, with common references edges;
   (c) a print wheel adjustably mounted on said frame, having a surface in contact with the master tape supported by an air bearing;
   (d) an air cap fixedly mounted opposite the print wheel comprising a surface closely spaced from the wheel, a shaped gap terminating in a slot in the surface, the slot having a size sufficient to pass a stationary line beam of radiant energy:
   (e) a pressure chamber in fluid communication with the slot and having a wall opposite the slot which is transparent to the line beam, and a source of fluid connected to the pressure chamber of a size sufficient to supply pressure fluid which when passing through the shaped slot and constrained by the shape of the slot and the space between the tape on the wheel and the bottom surface of the air cap provides a pressure profile having a wedge shape which has a peak under the slot and tapers smoothly to atmospheric pressure at the ends of the air cap surface, with a peak pressure of at least 40 psig sustained by a flow rate through the slot of less than 20 scfm;

(f) a source of a beam of energy with associated focusing means also mounted on the frame to create and direct the line beam through the pressure chamber transparent wall, the pressure chamber, the slot, and through the copy web to focus on the copy magnetic layer across the tape width; and (g) means separated from the supporting roller to drive one of the tapes at a constant speed.

24. Apparatus in accordance with claim 20 wherein the master tape is in the form of a continous loop and has a surface measure of roughness in excess of 0.0080 micrometers.

25. Apparatus in accordance with claim 23 additionally comprising a master tape storage means having a floor portion including turning rollers driven by a controlled speed drive at a preselected speed located at such points along the floor where a plane tangent to the floor contains a horizontal component.

26. Apparatus in accordance with claim 25 wherein said rollers are interconnected with O-rings.

* * * * *